United States Patent [19]

Adelberger

[11] Patent Number: 4,462,509

[45] Date of Patent: Jul. 31, 1984

[54] CURRENCY STACKER AND PRESENTER

[75] Inventor: Donald L. Adelberger, Dayton, Ohio

[73] Assignee: NCR Corporation, Dayton, Ohio

[21] Appl. No.: 447,930

[22] Filed: Dec. 9, 1982

[51] Int. Cl.[3] .......... B65G 60/00

[52] U.S. Cl. .......... 221/259; 271/3.1

[58] Field of Search .......... 414/37; 271/3.1; 221/259, 277; 209/534; 235/379; 194/4

[56] References Cited

U.S. PATENT DOCUMENTS

| | | | |
|---|---|---|---|
| 3,123,082 | 3/1964 | Call et al. | 133/4 |
| 3,442,363 | 5/1969 | Riddle et al. | 194/4 |
| 3,447,655 | 6/1969 | Tanaka et al. | 194/4 |
| 3,791,392 | 2/1974 | Hanson | 133/1 R |
| 4,251,010 | 2/1981 | Schmeykal et al. | 221/93 |

OTHER PUBLICATIONS

U.S. Application of Harley J. Shawen et al., Ser. No. 335,916, Filed Dec. 30, 1981 for "Record Media Dispensing Apparatus". This application is assigned to the same assignee as U.S. Ser. No. 447,930 filed Dec. 9, 1982.

*Primary Examiner*—Stanley H. Tollberg

*Attorney, Agent, or Firm*—J. T. Cavender; Albert L. Sessler, Jr.; Elmer Wargo

[57] ABSTRACT

A document stacker and presenter comprising a frame, a presenter unit pivotally mounted in the frame, first linkage for moving the presenter unit between first and second positions in the frame, receiving apparatus for receiving documents to be stacked, including a rotating stacker wheel, and a stripper yoke pivotally mounted in the frame, and second linkage for moving the stripper yoke between first and second positions. The stripper yoke, when in the first position, cooperates with the presenter unit when the presenter unit is also in said first position to form a stack of documents as they are received from said stacker wheel. The presenter unit also has a pressure plate associated therewith, and third linkage moves the pressure plate between an open position and a capture position in which the stack of documents is retained on said presenter unit by the pressure plate. The presenter unit also has endless belts thereon for feeding the stack between the presenter unit and the pressure plate when the pressure plate is in the capture position to deposit the stack of documents in a reject bin when the presenter unit is in the first position and to deposit the stack of documents in a customer access area when the presenter unit is in the second position.

8 Claims, 11 Drawing Figures

CURRENCY STACKER AND PRESENTER

BACKGROUND OF THE INVENTION

This invention relates to document handling apparatuses, and more particularly, it relates to a currency stacker and presenter which collects the documents such as currency and groups them prior to presenting them to a customer of an automated teller or cash dispensing machine, for example.

There are constant efforts being made to reduce the costs of currency dispensing apparatuses, to reduce the associated dispensing time, and to accommodate, readily, different sizes of documents or currency.

SUMMARY OF THE INVENTION

The present invention is the result of the efforts mentioned in the previous paragraph.

The present invention relates to a document stacker and presenter comprising: a frame; a presenter unit pivotally mounted in said frame; first moving means for moving said presenter unit between first and second positions in said frame; receiving means for receiving documents to be stacked, including a rotating stacker wheel; a stripper yoke pivotally mounted in said frame, and second moving means for moving said stripper yoke between first and second positions; said stripper yoke when in said first position cooperating with said presenter unit when said presenter unit is also in said first position to form a stack of documents as they are received from said stacker wheel; said presenter unit also having a pressure plate; third moving means for moving said pressure plate between an open position and a capture position in which said capture position said stack of documents is retained on said presenter unit by said pressure plate; said presenter unit also having means for feeding said stack between said presenter unit said pressure plate when said pressure plate is in said capture position to deposit said stack of documents in a reject bin when said presenter unit is in said first position and to deposit said stack of documents in a customer access area when said presenter unit is in said second position.

The present invention is low in cost and reduces the dispensing time when compared to prior art dispeners which move the documents through the dispensing apparatus with the long dimension of the documents being aligned along the direction of movement through the apparatus.

Another feature of the present invention is that it can accommodate different sizes of documents or bills in the dispensing operation.

These advantages and others will become more readily apparent in connection with the following description, claims and drawing.

DETAILED DESCRIPTION OF THE INVENTION

Figure 1:
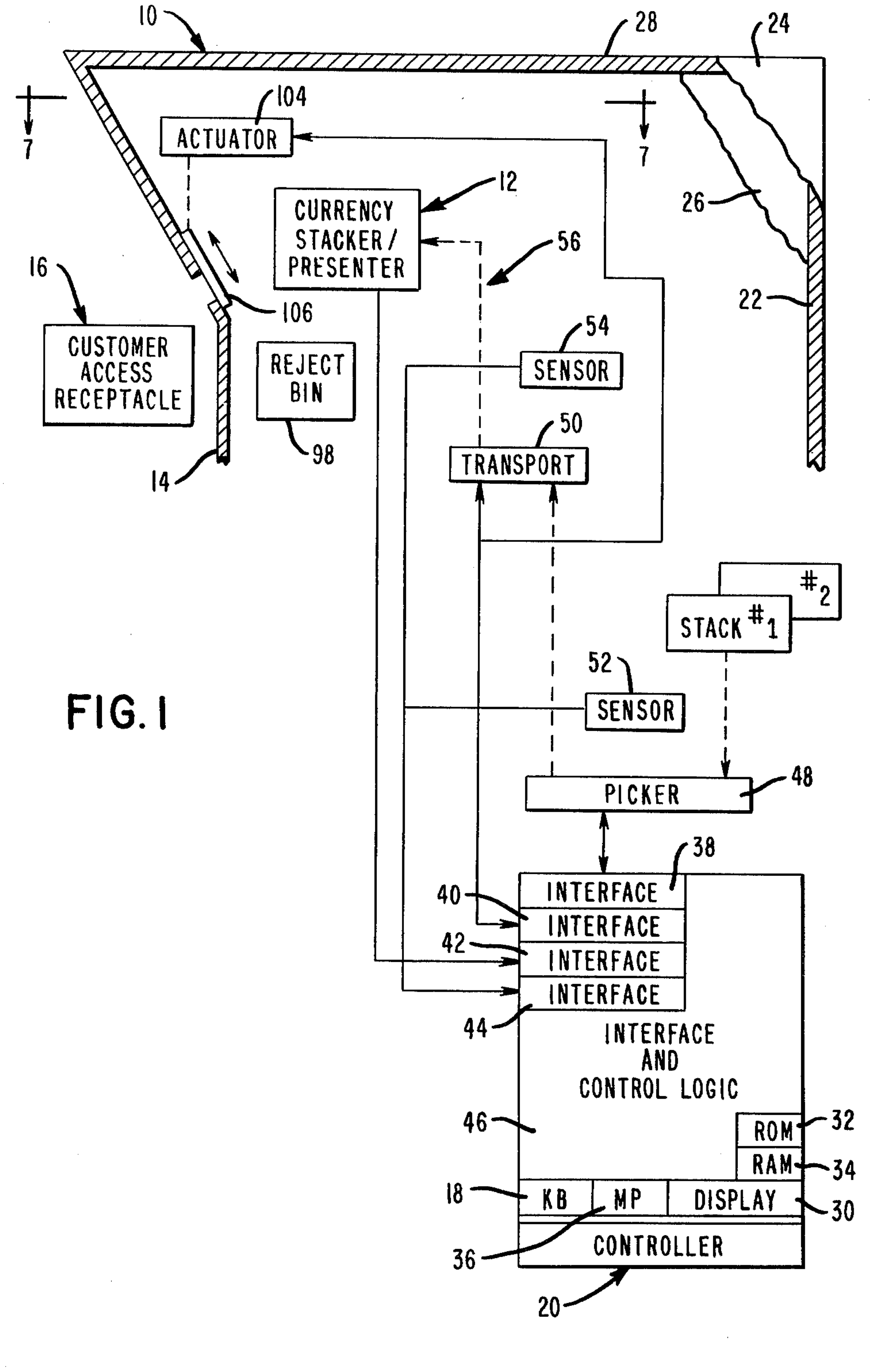
FIG. 1 is a schematic diagram, in block form, of a preferred embodiment of the currency stacker and presenter of this invention as it is orientated in a cash dispensing machine.

FIG. 1 is a general schematic diagram of a cash dispensing machine 10 in which the currency stacker and presenter 12 of this invention, hereinafter referred to as CSP 12, may be located. In order to orient the reader, a customer operating the machine 10 stands at the front 14 of the machine 10, near the customer access receptacle 16, and operates the machine conventionally, by entering data on a keyboard 18 located thereat; however, the keyboard (KB) 18 is shown associated with a controller 20 for ease of illustration thereof. The machine 10 also has a rear wall 22, a right wall 24, and a left wall 26, with only portions of the walls 24 and 26 being shown to simplify the drawing. A top wall 28 and a bottom or floor (not shown) conventionally complete a tamper-proof cabinet for the machine 10.

The controller 20 (FIG. 1) is conventional, and it is used to control the operation of the machine 10, including the CSP 12. The controller 20 includes the KB 18 mentioned and display 30 for communicating with a user of the machine. The KB 18 and the display 30 are physically located at the front 14 of the machine 10 to enable the user to use them; however, they are shown as part of the controller 20 to simplify the explanation of it. The controller 20 also includes a read only memory (ROM) 32, random access memory (RAM) 34, a processor (MP) 36, various interfaces 38, 40, 42 and 44, and interface and control logic 46 which provides the interconnections among the various elements mentioned to enable the MP 36 and the elements to function as what is considered an "intelligent" terminal. The various sets of instructions or routines associated with the controller 20 may reside in the ROM 32, or they may be loaded in the RAM 34 as part of a start-up procedure. The representation of controller 20 is designed to facilitate an explanation of its functions, and its actual construction may vary from the functional representation shown.

There are certain operations performed by the machine 10 (FIG. 1) before the CSP 12 of this invention is operated. For example, a customer operates the machine 10 and requests bills or currency, for example, to be dispensed therefrom. Assuming that the customer's account is satisfactory, as checked by the controller 20 in association with the records of a host bank (not shown), for example, the controller 20 then proceeds to control the operation of the machine 10 to dispense the requested amount.

Continuing with the example being discussed, assume that the customer wants $70.00 in U.S. currency and that the machine 10 dispenses currency or bills in $5.00 and $20.00 denominations. This means that the most typical combination of bills selected, for example, to make up the $70.00 sum is two $5.00 bills and three $20.00 bills. The machine 10 (FIG. 1) includes a stack #1 and $5.00 bills, for example, which are loaded in a cassette (not shown), and a stack #2 containing $20.00 bills which are similarly loaded in a cassette (not shown). The controller 20 (via its interface 38) actuates a conventional picker mechanism 48 to pick two $5.00 bills from stack #1 and transfer them to a conventional transport mechanism 50. Thereafter, the picker mechanism 48 (which is duplicated for stack #2) picks three $20.00 bills from stack #2 and similarly transfers them to the transport mechanism 50. Sensors such as 52 are used to check on the number of bills picked, and this information is routed to the controller 20 via its associated interface 44. The transport mechanism 50 is conventional and is coupled to the controller 20 (via the interface 40) to be controlled thereby. A sensor 54, positioned along the transport path (shown as dashed line 56), is used to detect a "doubles" or overlapping situation with the bills and can also be used to verify the amount of bills, which are in fact, about to enter the CSP 12. The sensor 54 is also coupled to the controller 20 via the interface 44.

Figure 2:
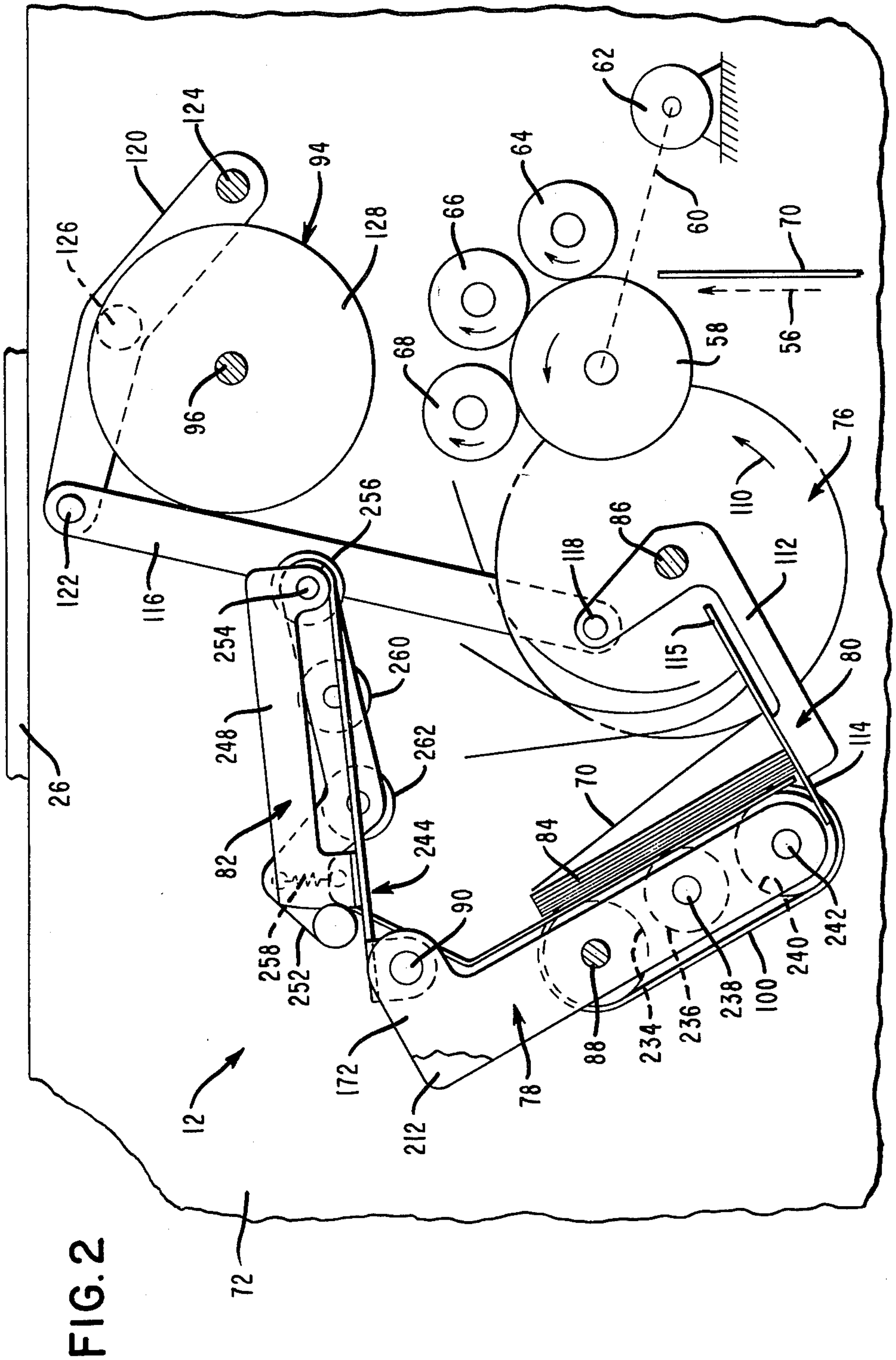
FIG. 2 is a side view, in elevation, and partly in cross section, showing additional details of the currency stacker and presenter (hereinafter called CSP) of this invention in a first position in which bills are accumulated therein.

A portion of the transport mechanism 50 shown in FIG. 1, is shown in more detail in FIG. 2. The transport mechanism 50 (adjacent to the CSP 12) includes a drive wheel 58 which is rotated in a counterclockwise direction (as viewed in FIG. 2) by a conventional pulley and belt (which are shown as a dashed line 60) and a motor 62. Idler rollers 64, 66, and 68, positioned around the periphery of the drive wheel 58, are utilized to feed a bill 70 therebetween. In the embodiment described, the height of the bill 70 is shown in FIG. 2, with its long dimension extending into the plane of the drawing.

In order to facilitate a description of the CSP 12, the CSP 12 is shown in various stages of operation in several of the figures of the drawing, with the associated mechanisms to effect those stages of operation being shown and described hereinafter.

FIGS. 2, 3, 4, 5, and 6 are all side views, in elevation; are partly in cross section; and are taken from a position in FIG. 1 in which one is located at the right wall 24 and looks towards the left wall 26. Naturally, certain portions of the machine 10 and the CSP 12 are removed from each of the FIGS. 2-6 to facilitate a showing of the CSP 12; however, those portions removed will become apparent as the description progresses. The various elements shown in FIGS. 2-6 are mounted between the side frames 72 and 74 shown best in FIG. 7, which side frames 72 and 74 enable the CSP 12 to be mounted as a unit within the machine 10. Portions of the left wall 26 and the right wall 24 are shown displaced from their normal positions in FIG. 7 and are included only to show the relationship of the CSP 12 to the machine 10.

Proceeding first with a general description of the CSP 12, FIG. 2 shows the CSP 12 in a first or home position in which it accumulates the bills like 70 to be dispensed. Basically, the CSP 12 includes a conventional, stacker wheel 76, a presenter unit 78, a stripper yoke 80, and a pressure plate 82 which are positioned as shown.

The bills 70 coming from the stacks #1 and #2 (FIG. 1) are fed along the transport path 56, as previously described, and are fed, conventionally, by the drive wheel 58 and idler rollers 64, 66, and 68 (FIG. 2) into the stacker wheel 76. The stripper yoke 80 is used to strip the bills 70 from the stacker wheel 76 and support them in cooperation with the presenter unit 78 so as to cradle the resulting stack 84 of bills therebetween. For the moment, it is sufficient to state that the stacker wheel 76 is rotated by a shaft 86 which is rotatably mounted in the side frames 72 and 74; that the presenter unit 78 is pivotally mounted on a shaft 88 which is supported in the side frames 72 and 74; that the pressure plate 82 is pivotally joined to the presenter unit 78 by a shaft 90 which is mounted on the presenter unit 78; and that the stripper yoke 80 is pivotally mounted on the shaft 86.

When the number of bills 70 to be dispensed is reached, as determined by the controller 20, the controller 20 then initiates a dispensing operation. In this regard, the controller 20 energizes a motor 92 (FIG. 7) which rotates a cam line 94, including the cam shaft 96, to effect certain movements to be described in detail, hereinafter.

Figure 3:
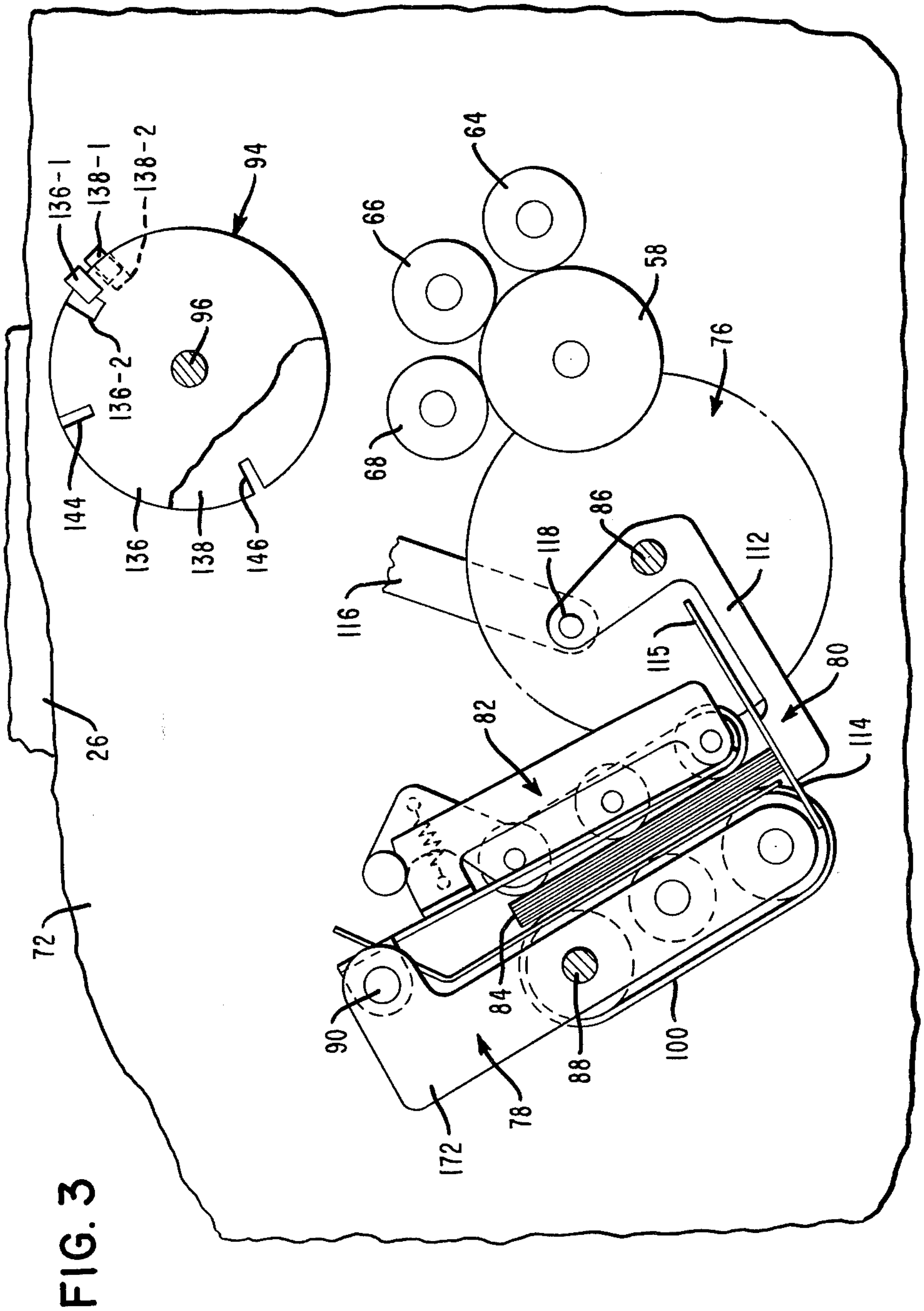
FIG. 3 is a view similar to FIG. 2, showing the accumulated documents or bills being gripped between a presenter unit and a pressure plate associated with the CSP.

One of the first movements effected by the cam line 94 is to pivot the pressure plate 82 (via the shaft 90 of the presenter unit 78) so that the pressure plate 82 is moved from the position shown in FIG. 2 to the position shown in FIG. 3 in which the stack 84 of bills 70 is squeezed therebetween.

Figure 4:
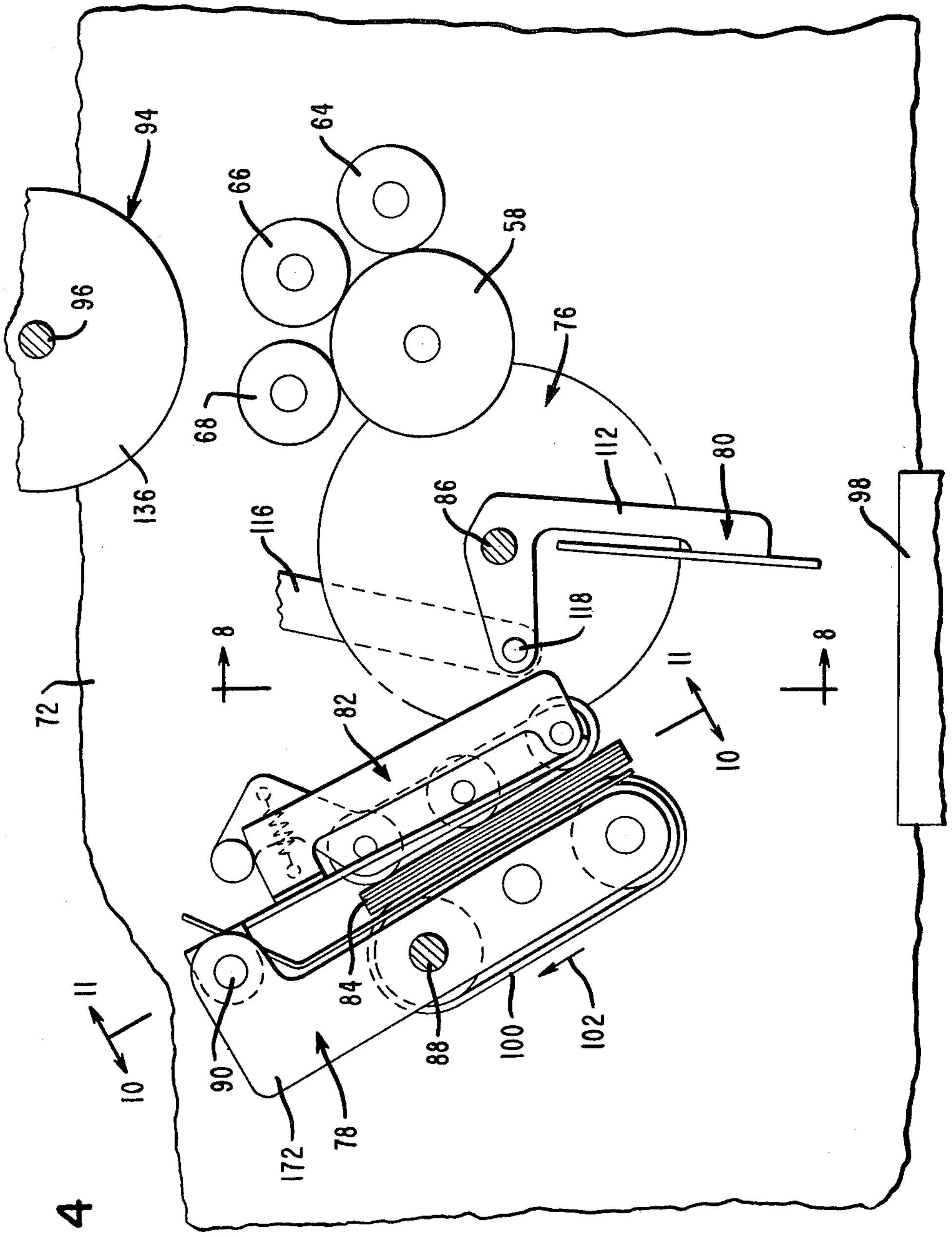
FIG. 4 is a view similar to FIG. 2, showing a stripper yoke being moved out of operative association with the presenter unit, and with the presenter unit being shown in a purge position.

After the stack 84 of bills 70 is squeezed as shown in FIG. 3, the stripper yoke 80 is pivoted about shaft 86 from the position shown therein to the position shown in FIG. 4. The presenter unit 78 is shown in a first or "purge" position in FIG. 4 from which the stack 84 of bills 70 may be deposited in a reject bin 98 located within the machine 10. The controller 20 initiates a purge operation whenever a wrong count is detected or a "double bill" is detected by sensor 54 (FIG. 1), for example. To purge the stack 84 of bills, endless belts like 100 are moved in the direction of arrow 102 by means to be later described herein, causing the stack 84 to be moved downwardly, as viewed in FIG. 4, to move the stack 84 of bills into the reject bin 98.

Figure 5:
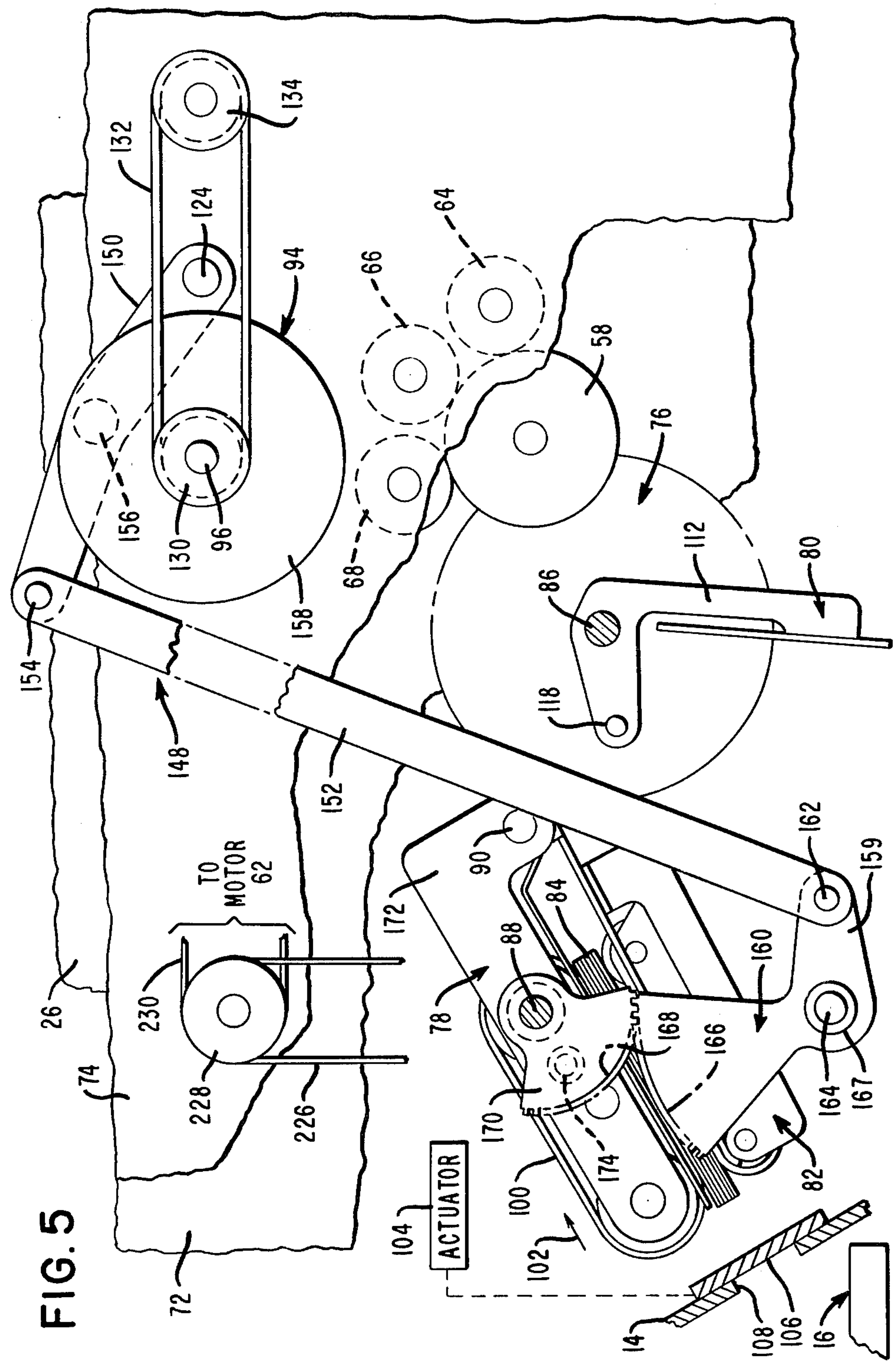
FIG. 5 is a view similar to FIG. 2, showing the presenter unit in a dispensing position to deliver the bills to a customer.

Assuming that the number of bills 70 in the stack 84 is correct, and that the bills 70 are to be delivered to the customer of the machine 10, the presenter unit 78 and the pressure plate 82 with the stack 84 therebetween are pivoted about shaft 88 from the position shown in FIG. 4 to that shown in FIG. 5, which is considered the second or customer dispensing position. To dispense the stack 84 of bills, the controller 20 energizes the actuator 104 which lifts a protective door 106, exposing a slot 108 in the front wall 14, and thereafter, the endless belts 100 are moved in the direction of arrow 102 to move the stack 84 of bills out the slot 108 and into the customer access bin 16.

After the stack 84 of bills is dispensed to a customer, the presenter unit 78 and the pressure plate 82 remain biased together as shown in FIG. 5 and thereafter, they are pivoted about shaft 88 to the first position shown in FIG. 4, which is the purge position. From this purge position, any bills 70 which may remain, accidentally, between the presenter unit 78 and the pressure plate 82 are dispensed into the reject bin 98.

After the purge operation mentioned with regard to FIG. 4 is completed, the pressure plate 82 and the stripper yoke 80 are returned to the home positions shown in FIG. 2 from which a new, cash-dispensing operation may be commenced.

Having explained the general operation of the CSP 12, the means for effecting the various movements described will now be discussed.

Figure 8:
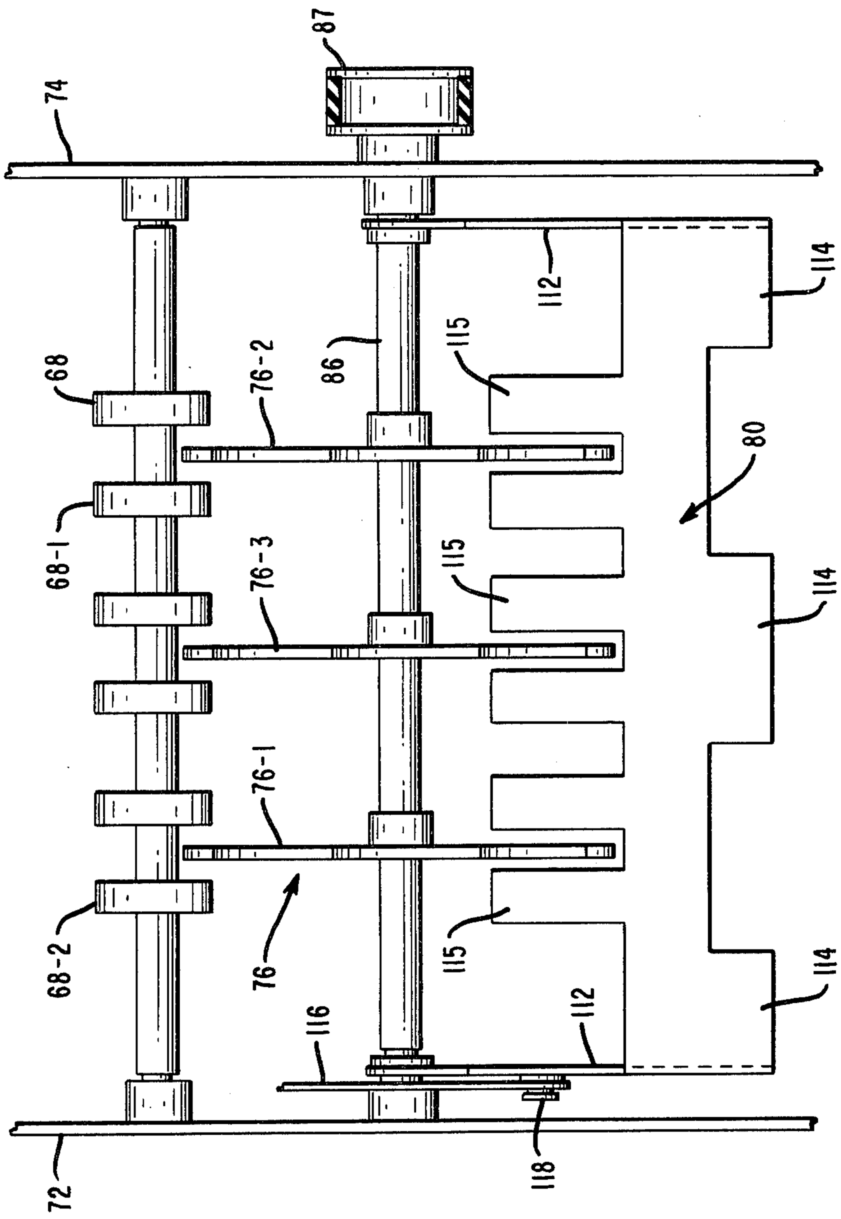
FIG. 8 is a cross-sectional view, taken along the line 8—8 of FIG. 4, to show additional details of the stripper yoke.

Beginning with FIG. 2, the stacker wheel 76 is rotated in the counterclockwise direction shown by arrow 110 by conventional connection means like pulley 87 shown in FIG. 8 which is driven by motor 62. The conventional stacker wheel 76 has adjacent tines forming receiving pockets therein into which the bills are inserted as they are received from the drive wheel 58 and the idler rollers 64, 66, and 68. In the embodiment described, the rotational velocity of the drive wheel 58 is such as to feed the bills 70 into the stacker wheel 76 at a rate of four bills per second.

The stripper yoke (FIG. 2) is comprised of a bell-crank lever 112 which is pivotally mounted on the shaft 86 and has a plurality of spaced fingers 114 which are meshed between spaced belts 100 on the presenter unit 78 so as to provide a secure stop to the bills 70. The stack 84 of bills is formed with their long, lower sides resting on the fingers 114. The stripper yoke 80 also has fingers 115 which extend between seven spaced tines (with only a few tines like 76-1, 76-2 and 76-3 being shown in FIG. 8) on the stacker wheel 76 to strip, conventionally, the bills from the stacker wheel 76, forming the stack 84 of bills.

Figure 7:
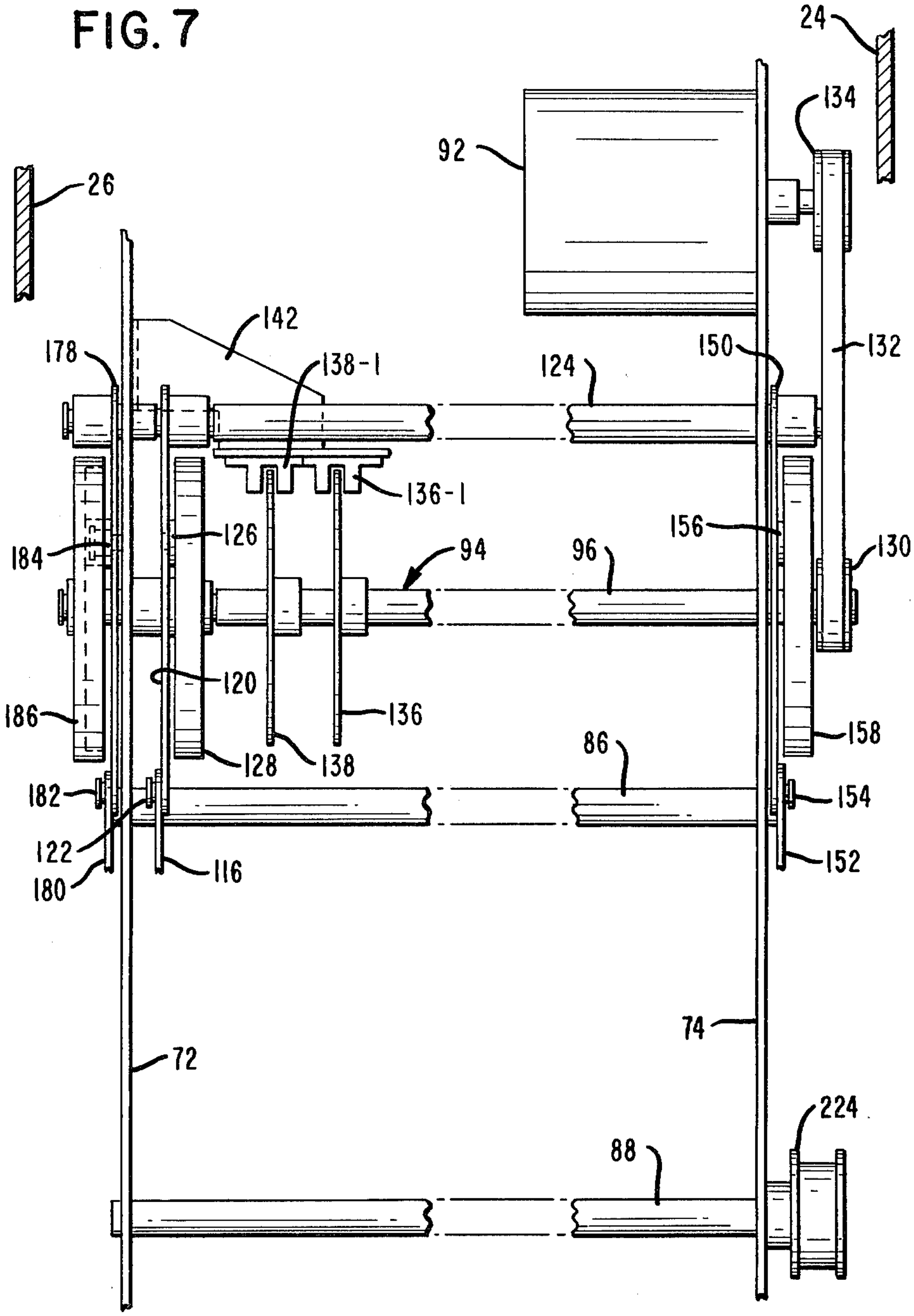
FIG. 7 is a top view of the CSP and is taken along the line 7—7 of FIG. 1 to show additional details thereof.

The means for moving the stripper yoke 80 from the position shown in FIG. 2 to the position shown in FIG. 4 is shown mainly in FIGS. 2, 7 and 8. The stripper yoke 80 has one end of a link 116 pivotally joined thereto by a pin 118, and the remaining end of the link 116 is pivotally joined to one end of a cam lever 120 by a pin 122. The remaining end of the cam lever 20 is pivotally mounted on a rod 124 which is secured between the side frames 72 and 74 as is shown best in FIG. 7. The cam lever 120 has a stud 126 projecting therefrom to coact with a conventional, box-type cam 128. The cam 128 has its camming surfaces located internally in the cam 128 to coact with the stud 126 when the cam shaft 96 of the cam line 94 is rotated.

The means for rotating the cam line 94 and the cam shaft 96 is shown best in FIG. 7. The cam shaft 96 has a pulley 130 fixed to one end of the shaft 96, and a timing chain belt 132 connects the pulley 130 with the output driving pulley 134 of the motor 92. The motor 92 is a conventional, reversible, electric motor such as type E5-5025 which is manufactured by COLMAN O.E.M. INC. The motor 92 also is of the type which has an internal brake associated therewith, which brake enables the motor 92 to hold the cam line 94 in a fixed position when the motor 92 is denergized.

Figure 9:
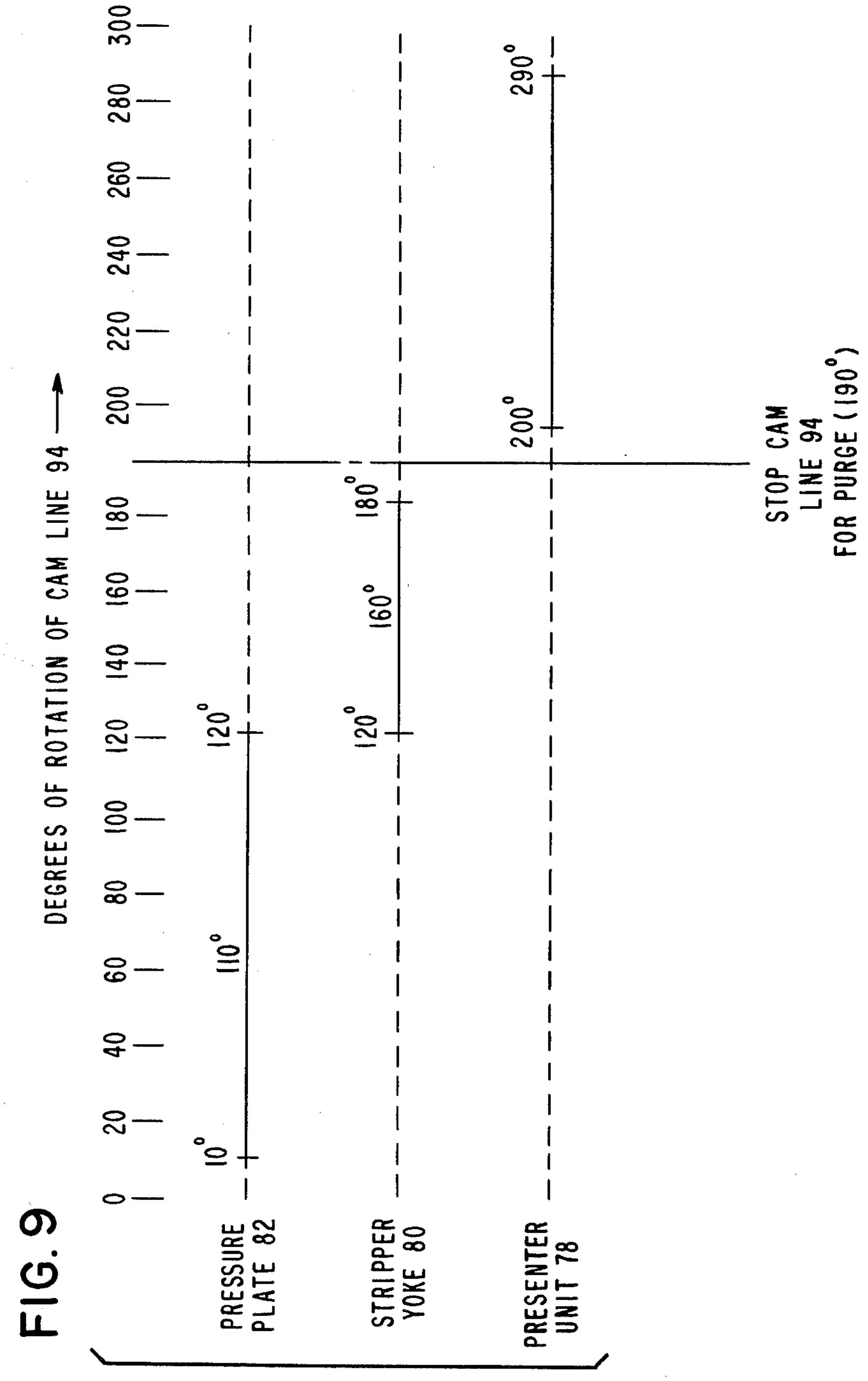
FIG. 9 is a timing chart showing various functions performed for various angles of rotation of a cam line shown in FIG. 7.

Before discussing the motion effected by the cam 128 on the stripper yoke 80 (FIG. 2), it appears appropriate to discuss some of the timing aspects associated with the cam line 94. The various positions of the cam line 94 are detected by a pair of timing discs 136 and 138 which are fixed to the cam shaft 96 to rotate therewith as shown in FIGS. 7 and 3. A first light-and-sensor combination 136-1 (FIG. 7) is positioned to coact with certain slots on disc 136, and a second light-and-sensor combination 138-1 is positioned similarly to coact with certain slots on the disc 138. The sensor combinations 136-1 and 138-1 are secured to a bracket 142 which is fixed to the side frame 72 as shown in FIG. 7. The sensor combinations 136-1 and 138-1 are displaced slightly, angularly, as shown in FIG. 3 to cooperate with slightly, angularly displaced slots 136-2 and 138-2 in discs 136 and 138, respectively, so as to facilitate the location of a home position with regard to the cam line 94. The two signals coming from the light-and-sensor combinations 136-1 and 138-1 will indicate a home position of the discs 136 and 138 (shown in FIG. 3) to the controller 20. The slot 144 in disc 136, when coacting with sensor combination 136-1, is used to detect the customer dispense or "present" position when the cam line 94 and discs 136 and 138 are rotated through an angle of 300 degrees in a counterclockwise direction (as viewed in FIG. 3) from the home position shown. The slot 146 in disc 138 is used to locate the purge position of the CSP 12 when the cam line 94 rotates in a counterclockwise direction through an angle of 190 degrees from the position shown in FIG. 3 to coact with the associated sensor combination 138-1. The various movements of the pressure plate 82, the stripper yoke 80, and the presenter unit 78, as integrated by various degrees of rotation of the cam line 94, are shown in FIG. 9; however, these aspects will be discussed hereinafter.

Continuing with the various interconnections associated with the cam line 94, FIGS. 5 and 7 show the means 148 for moving the presenter unit 78 from the home position shown in FIG. 2, (which is the same as the purge position shown in FIG. 4), to the second or the "dispense-to-customer" position, shown in FIG. 5. Starting at the cam line 94, the means 148 for moving the presenter unit 78 includes a cam lever 150 having one end pivotally mounted on the rod 124 and the remaining end thereof being pivotally joined to one end of a link 152 by a pin 154. A stud 156, extending from the cam lever 150, coacts with a conventional, box-type cam 158. Notice that in the actual construction, the cam line 150, the cam 158, and the link 152 are located on the outside of the side frame 74; however, in FIG. 5, the presenter unit 78 and the stripper yoke 76, for example, are shown in solid outline to facilitate a showing thereof even though they lie behind the side frame 74.

Continuing with the description of the means 148 for moving the presenter unit 78, the lower end of link 152 is pivotally joined to one end 159 of a drive segment 160 by a pin 162 as shown in FIG. 5. The pin 162 passes through a slot (not shown) in the side frame 74 to enable the drive segment 160 to be located inside the side frame 74 so as to enable it to pivot or drive the presenter unit 78, which is also located inside the side frames 72 and 74. The drive segment 160 is fixed to a stud 164 which passes through the frame 74 and is secured to a boss 167 which is located on the outside of the frame 74; however, it is shown on the inside of frame 74 in FIG. 10 to facilitate the showing thereof. The drive segment 160 has gear teeth 166 thereon which mesh with mating teeth 168 on a driven segment 170. The driven segment 170 is fixed to the side frame 172 by a pin 174 (FIG. 10) to pivot the presenter unit 78 between the various positions mentioned. When the link 152 is pushed downwardly, as viewed in FIG. 5, it rotates the drive segment 160 in a clockwise direction to move the presenter unit 78 from the position shown to the purge position shown in FIG. 4. The presenter unit 78 is moved from the purge position shown in FIG. 4 to the dispensing position shown in FIG. 5 by having the link 152 move upwardly to rotate the drive segment 160 in a counterclockwise direction.

Figure 6:
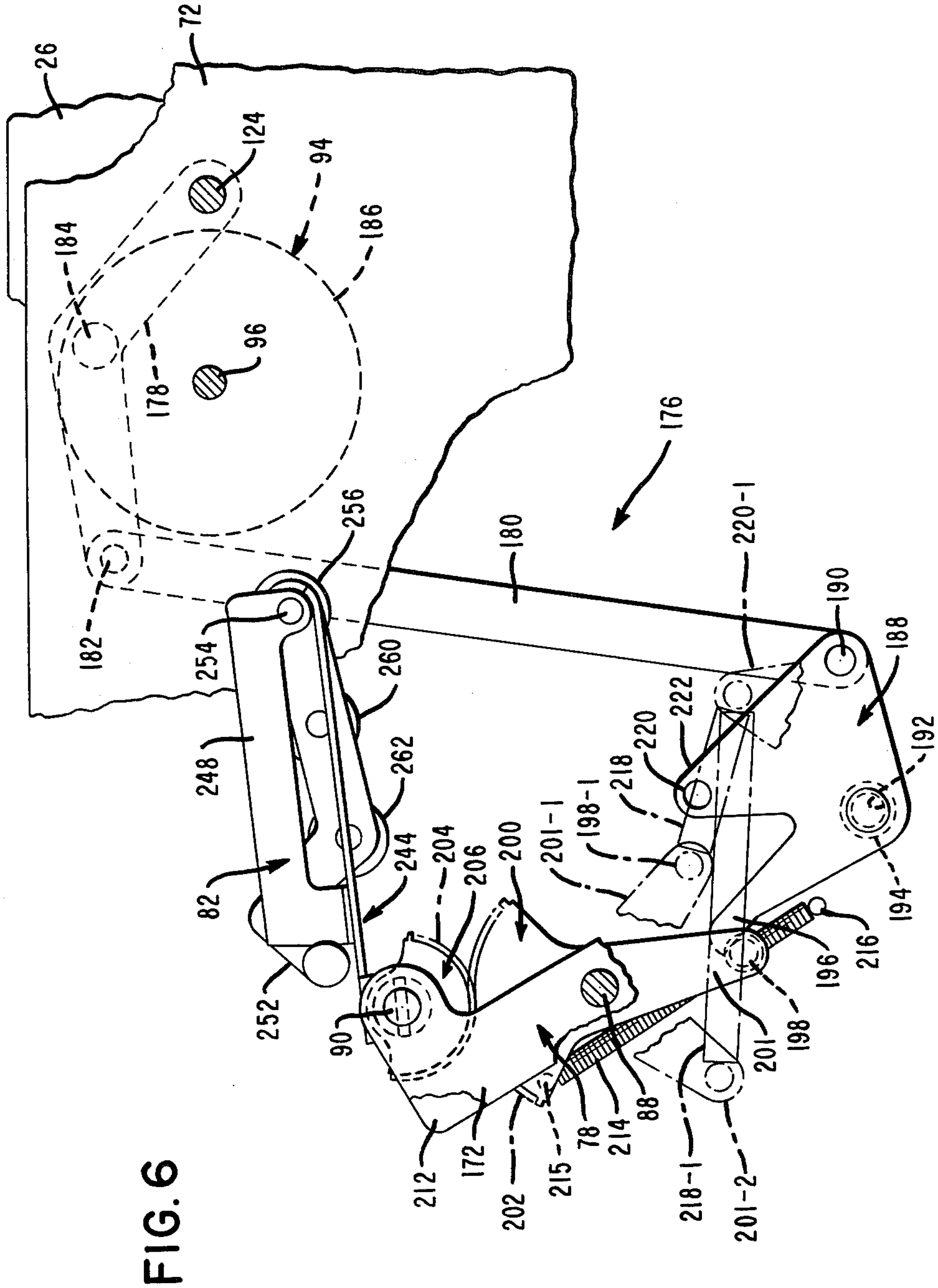
FIG. 6 is a view similar to FIG. 2, showing the linkage associated with the pressure plate.

The means 176 for moving the pressure plate 82 to the various positions mentioned is shown in FIGS. 6 and 7. The means 176 includes a cam lever 178 having one end pivotally joined to the rod 124 and the remaining end thereof pivotally secured to one end of a link 180 by a pin 182. A stud 184, extending from cam lever 178, cooperates with a box cam 186 which is fixed to the cam shaft 96 and is part of the cam line 94. The cam 186, cam lever 178 and some of the remaining linkage to be described and shown in FIG. 6 are located on the outside of side frame 72; however, they are shown in solid outline in FIG. 6 to facilitate a showing thereof.

Figure 10:
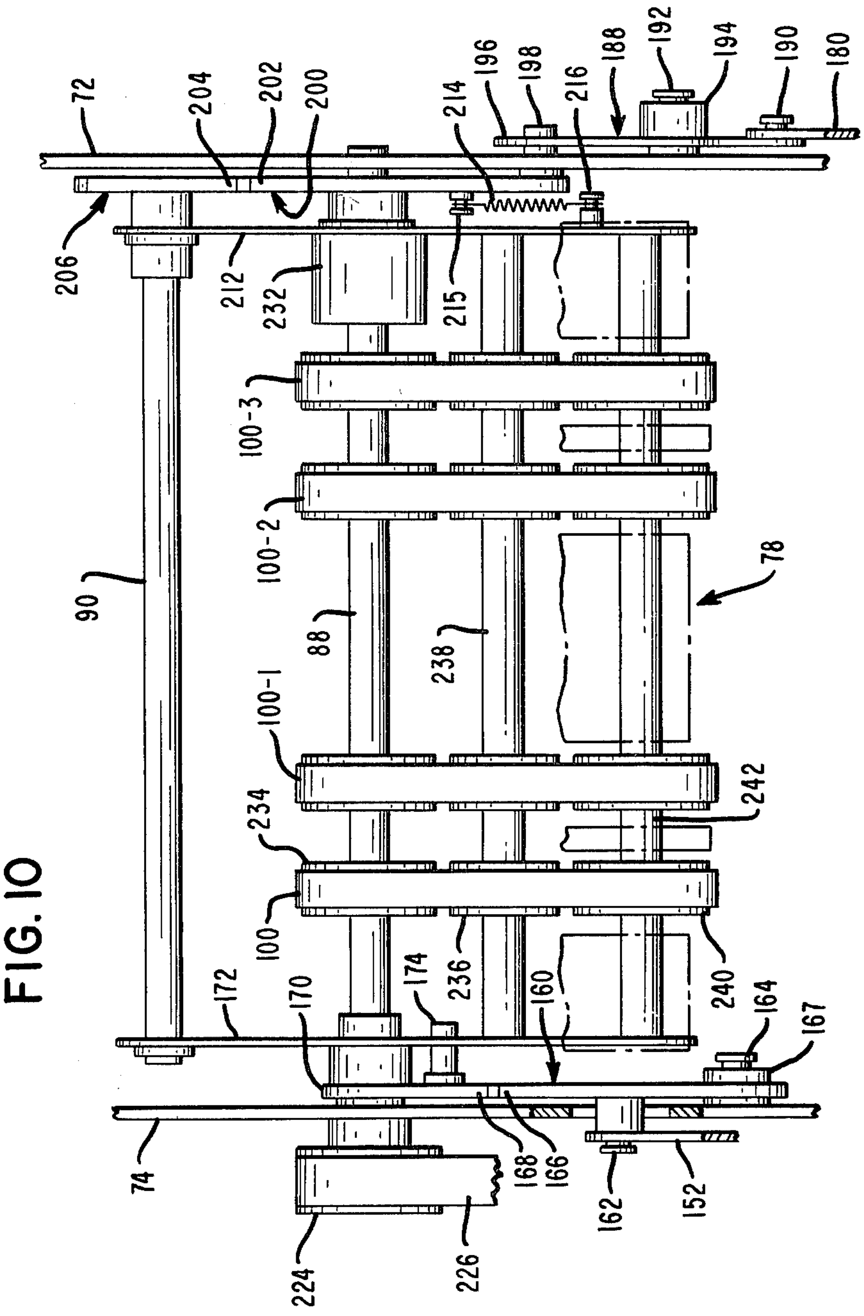
FIG. 10 is a view which is taken along the line 10—10 of FIG. 4 to show additional details of the presenter unit.

The lower end of link 180 (FIG. 6) is pivotally joined to a drive arm 188 by a pin 190. The drive arm 188 is located on the outside of side frame 72 and has a short rod 192 which is pivotally mounted and axially secured in a boss 194 which is secured to the outside of side frame 72. The drive arm 188 has a neck portion 196 which engages a roll and pin 198 located on the outside of the side frame 72, with the associated pin extending through a slot in the side frame 72 and being secured to one end 201 of a drive segment 200. The drive segment 200 is located on the inside of side frame 72 and is pivotally mounted on the shaft 88. The drive segment 200 has an arcuately-shaped, gear portion 202 which meshes with a gear portion 204 on a driven segment 206. The drive segment 200 and the driven segment 206 are coplanar and are located on the inside of frame 72 as shown in FIG. 10. The driven segment 206 is fixed to the shaft 90 which is pivotally mounted in the side frames 172 and 212 of the presenter unit 78. A long tension spring 214 produces a bias on the drive segment 200 to rotate the drive segment 200 (about shaft 88) in a counterclockwise direction as viewed in FIG. 6. The spring 214 is located on the inside of side frame 72 and has one end which is joined to the drive segment 200 by a stud 215 (FIG. 6), and the remaining end thereof is joined to a stud 216 which is secured to the side frame 212 (FIG. 10) of the presenter unit 78. A short spring 218, located on the outside of frame 72 has one end thereof secured to the pin of the rod and roll 198 and has the remaining end thereof secured a stud 220 extending from a finger portion 222 which is part of the drive arm 188.

When the link 180 is moved downwardly (by the box cam 186) as viewed in FIG. 6, the drive arm 188 is rotated in a clockwise direction, moving the neck portion 196 away from the pin and roll 198. This action permits the long spring 214 to pivot the drive segment 200 (about shaft 88) to the position shown by end 201-1, to thereby rotate the driven segment 206 and to thereby pivot the pressure plate 82 to compress the stack 84 of bills against the presenter unit 78 as shown in FIG. 4. In the position shown in FIG. 4, the weight of the pressure plate 82 (due to gravity) also assits in compressing the stack 84 of bills. When the presenter unit 78 and the pressure plate 82 are moved to the customer dispensing position by the means 148 shown in FIG. 5, the weight of the pressure plate 82, again due to gravity, tends to lessen the compressive force on the stack 84 of bills. To compensate for this, the spring 218 is stretched (as shown at 218-1) to increase the compressive force by the pressure plate 82 when the drive segment 200 and the presenter unit 78 are moved to the customer dispensing position shown in FIG. 5, in which position, the end 201 of drive segment is located at 201-2 as shown in FIG. 6.

When the presenter unit 78 and the pressure plate 82 are in the customer dispensing position shown in FIG. 5, a pulley 224 (FIG. 10) which is fixed to shaft 88 is used to rotate it. The pulley 224 is located, physically, on the outside of frame 74 as shown in FIG. 10, and a timing belt 226 (also shown in FIG. 5) is used to connect the drive pulley 224 to a conventional, rotating clutch 228 which is connected by a driving belt 230 (FIG. 5) to the motor 62 (FIG. 2) by suitable connecting means (not shown). When the clutch 228 is energized by the controller 20 (FIG. 1), it rotates the pulley 224 to drive the endless belts 100 to move the stack 84 of bills out of the dispensing slot 108 (FIG. 5) as previously explained. During the time that the presenter unit 78 and the pressure plate 82 are moved as a unit from the position shown in FIG. 4 to the position shown in FIG. 5, a conventional one-way clutch 232 (FIG. 10), fixed to a side frame 212 of the presenter unit 78 and receiving the shaft 88, prevents the shaft 88 from rotating in a direction which would move the stack 84 of bills in a direction away from the dispensing slot 108.

FIG. 10 shows additional details of the presenter unit 78. The endless belts shown as 100 in FIGS. 2–5 are comprised of a plurality of belts 100, 100-1, 100-2, and 100-3 as shown in FIG. 10. Belt 100 is mounted on a pulley 234 which is fixed to shaft 88 to rotate therewith. A second pulley 236 is rotatably mounted on a rod 238 whose ends are secured to the side frames 172 and 212. A third pulley 240 is rotatably mounted on a second rod 242 whose ends are similarly secured to the side frames 172 and 212. The construction just described which is associated with the belt 100 is identical for belts 100-1, 100-2 and 100-3 and need not be described in any further detail. When shaft 88 is rotated or driven, the belts 100, 100-1, 100-2, and 100-3 are driven to discharge the stack 84 of bills when the presenter unit 78 is in the customer dispense position shown in FIG. 5 and the purge position shown in FIG. 4.

Figure 11:
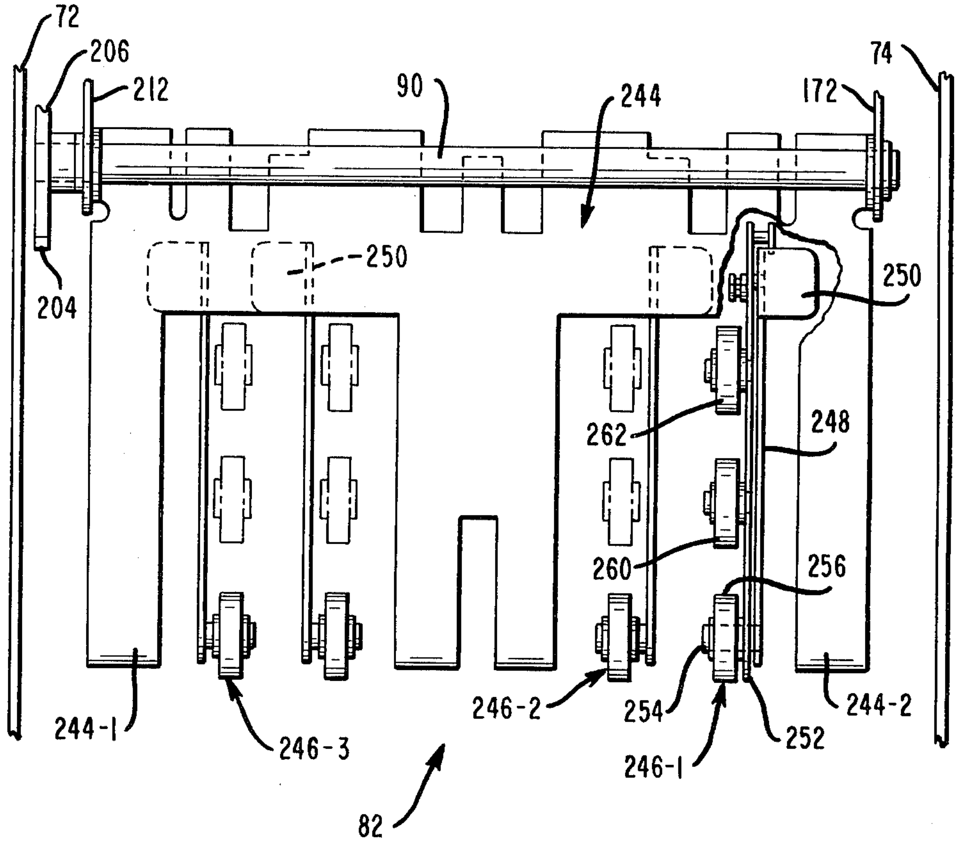
FIG. 11 is a cross-sectional view, taken along the line 11—11 of FIG. 4, to show additional details of the pressure plate associated with the presenter unit.

FIG. 11 shows additional details of the pressure plate 82 which includes a frame member 244 having the fingers such as 244-1, 244-2 extending therefrom. The frame member 244 is fixed to the shaft 90 to be pivoted thereby whenever the driven segment 206 is rotated as previously described. The pressure plate 82 also has a plurality of roller segments such as 246-1, 246-2, and 246-3, with one of these segments being provided for each belt like 100, 100-1, etc., shown in FIG. 10, and being aligned therewith. Because the roller segments like 246-1, 246-2, and 246-3 are alike, a description of only one need be given. The roller segment 246-1 includes a plate member 248 which is fixed to the associated frame 244 at the flat area 250. A roller support arm 252 (also shown in FIG. 6, for example), is pivotally joined to the free end of the plate member 248 by a pin 254 which also rotatably supports a roller 256. The support plate 252 pivots about the pin 254 and is biased to pivot in a counterclockwise direction, as viewed in FIG. 2, by a tension spring 258, shown in dashed outline therein. The support arm 252 also has rollers 260 and 262 rotatably mounted thereon as shown in FIG. 11. The rollers 256, 260 and 262 extend below the frame 244, as shown in FIG. 6, so as to engage and compress the stack 84 of bills as previously explained. The support arm 252 (FIG. 2) is resiliently biased by spring 258 so as to accommodate different thicknesses of a stack 84 of bills, and also to allow for the fact that roller 262 will contact the stack 84 before roller 256 will, when the pressure plate 82 is moved from the position shown in FIG. 2 to the position shown in FIG. 3. The roller segments like 246-1 and 246-2 and the fingers 244-1 and 244-2 are spaced and aligned as shown in FIG. 11 in conjunction with the individual wheels like 76-1 and 76-2 of the stacker wheel 76 (FIG. 8) to enable the pressure platen 82 to move "through" the stacker wheel 76 when moving from the position shown in FIG. 2 to the position shown in FIG. 3.

FIG. 9 shows the correlation among the various elements, already described, which are associated with the cam line 94 shown in FIG. 7. After the correct number of bills 70 is accumulated in the stack 84 as shown in FIG. 2, the controller 20 (FIG. 1) issues a command to the motor 92 to rotate the cam line 94 in a counterclockwise direction as viewed in FIG. 2. After about 10 degrees of rotation, the link 180 (FIG. 6) is pushed downwardly, as previously described, to cause the pressure plate 82 to squeeze the stack 84 of bills therebetween as shown in FIG. 3; this action continues until 120 degrees of rotation of the cam line 94 (FIGS. 9), and thereafter, the associated cam 186 (FIG. 6) produces an idle motion on link 180 from 120 degrees to 300 degrees of rotation of the cam line 94. At 120 degrees of rotation of the cam line 94, the cam 128 (FIG. 2) associated with the stripper yoke 80 will move the link 116 downwardly, as previously described, to move the stripper yoke 80 from the position shown in FIG. 2 to the position shown in FIG. 4; this action continues from 120 degrees of rotation through 180 degrees as shown in FIG. 9, and thereafter, the cam 128 produces an idle on link 116 from 180 degrees to 300 degrees of rotation of the cam line 94. It should be recalled that the 190 degree rotation of the cam line 94 or the purge position is detected by the slot 146 in disc 138 (FIG. 3) and the associated sensor combination 138-1. At the position shown in FIG. 4, which is the purge position, the controller 20 could energize the clutch 228 (FIG. 5) to move the belts 100 to purge the stack 84 of bills into the reject bin 98. Assuming that the stack 84 of bills is to be dispensed to a customer, continued rotation of the cam line 94 will cause the presenter unit 78 and the pressure plate 82 to be moved from the position shown in FIG. 4 to the position shown in FIG. 5 as follows. When the cam line 94 is rotated through 200 degrees, the box cam 158 (FIG. 5) begins to move the link 152 upwardly, as viewed in FIG. 5 and as previously explained; this action continues until the cam line 94 has moved through 290 degrees of rotation and thereafter, the motor 92 (FIG. 7) is deenergized to brake the cam line 94 in this position when the slot 144 in disc 136 (FIG. 3) reaches the sensor combination 136-1, indicating the customer dispense position as previously. Thereafter, the controller 20 energizes the actuator 104 (FIG. 5) to move the door 106 away from the slot 108, and the controller 20 then energizes the clutch 228 to drive the endless belts 100 on the presenter unit 78 to move the stack 84 of bills out of the slot 108 to the customer access receptacle 16 as previously described. The door 106 is then closed and thereafter, the cam line 94 is rotated in a clockwise direction, as viewed in FIG. 3, until the slot 146 in disc 138 reaches the associated sensor combination 138-1 to indicate the purge position shown in FIG. 4. The controller 20 then denergizes the motor 92 (FIG. 7) in the purge position, and the motor 92 brakes or retains the cam line 94 in the purge position until a purge operation is completed as previously explained. This purging operation is to remove any bills which may have remained between the presenter unit 78 and the pressure plate 82 after a dispense-to-customer operation. As seen from FIG. 9, only the cam 158 (FIG. 5) associated with the presenter unit 78 is active from 290 degrees of rotation back to 200 degrees. After the purge operation mentioned, the stripper yoke 80 is moved back to the position shown in FIG. 2, and thereafter the pressure plate 82 is moved to the position shown in FIG. 2 When the cam line 94 is further rotated, the home position slots 136-2 and 138-2 coact with their associated sensor combinations 136-1 and 138-1, respectively, to indicate the home position, at which time the motor 92 is deenergized by the controller 20, and the motor 92 brakes or retains the cam line 94 in the home position. A new dispensing operation may then be repeated.

An additional comment appears to be in order. When the pressure plate is in the position shown in FIG. 6, the pressure plate 82 may be manually rotated in a counterclockwise direction about shaft 90 to facilitate clearing the CSP 12 of any document jams which may occur.

I claim:

1. A document stacker and presenter comprising:
- a frame;
- a presenter unit pivotally mounted in said frame;
- first moving means for moving said presenter unit between first and second positions in said frame;
- receiving means for receiving documents to be stacked, including a rotating stacker wheel;
- a stripper yoke pivotally mounted in said frame, and second moving means for moving said stripper yoke between first and second positions;
- said stripper yoke when in said first position cooperating with said presenter unit when said presenter unit is also in said first position to form a stack of documents as they are received from said stacker wheel;
- said presenter unit also connected to a pressure plate;
- third moving means for moving said pressure plate between an open position and a capture position in which said capture position said stack of documents is retained on said presenter unit by said pressure plate;
- said presenter unit also having means for feeding said stack between said presenter unit and said pressure plate when said pressure plate is in said capture position to deposit said stack of documents in a reject bin when said presenter unit is in said first position and to deposit said stack of documents in a customer access area when said presenter unit is in said second position.

2. The document stacker and presenter as claimed in claim 1 in which said means for feeding said stack includes at least one endless belt unit mounted on said presenter unit and a drive shaft operatively coupled to said endless belt unit;
- said presenter unit being pivotally mounted on said drive shaft which is rotatably mounted in said frame.

3. The document stacker and presenter as claimed in claim 2 in which said presenter unit includes spaced parallel side members and said third means includes a driving shaft which is rotatably mounted in said side members to enable said pressure plate to be pivotally mounted on said presenter unit; said driving shaft being operatively coupled to said third means to enable said third means to rotate said driving shaft to pivot said pressure plate into said capture position.

4. The document stacker and presenter as claimed in claim 3 in which said pressure plate has at least one roller unit to be aligned with said endless belt unit when said pressure plate is in said capture position;

said pressure plate having a frame in which a first end of said roller unit is pivotally mounted, said roller unit also having a second end including a resiliently member to resiliently bias said second end towards said stack when said pressure plate is in said capture position so as to accommodate a said stack of varying thicknesses.

5. The document stacker and presenter as claimed in claim 2 in which said means for feeding said stack also includes a one way clutch secured to said presenter unit and said drive shaft to enable said drive shaft to be rotated in only one direction to effect the depositing of said stack of documents in said reject bin and said customer access area.

6. The document stacker and presenter as claimed in claim 1 in which said first, second, and third moving means have a common cam line from which said first, second, and third moving means are operated.

7. The document stacker and presenter unit as claimed in claim 6 in which said common cam line comprises a common drive shaft and means for detecting the location of said common drive shaft with regard to a home position of said common cam line in which said home position said first moving means moves said presenter unit to said first position, said second moving means moves said stripper yoke to said first position, and said third moving means moves said pressure plate to said open position;

said common cam line also including a reversible motor operatively coupled to said common drive shaft.

8. The document stacker and presenter unit as claimed in claim 7 in which said first, second, and third moving means include, respectively, first, second, and third cams which are fixed to said common drive shaft; said first, second and third cams being designed to sequence said document stacker and presenter unit so as to move said pressure plate from said open position to said capture position, and thereafter to move said stripper yoke from its said first position to said second position, and thereafter to move said presenter unit from its said first position to said second position as said cam line is rotated in a first direction.

* * * * *